(12) United States Patent
Kimura

(10) Patent No.: US 8,364,093 B2
(45) Date of Patent: Jan. 29, 2013

(54) WIRELESS TRANSMITTING/RECEIVING METHOD AND WIRELESS TRANSMITTING/RECEIVING APPARATUS

(75) Inventor: Tohru Kimura, Tokyo (JP)

(73) Assignee: NEC Corporation, Tokyo (JP)

(*) Notice: Subject to any disclaimer, the term of this patent is extended or adjusted under 35 U.S.C. 154(b) by 1123 days.

(21) Appl. No.: 11/992,773

(22) PCT Filed: Aug. 28, 2006

(86) PCT No.: PCT/JP2006/316860
§ 371 (c)(1),
(2), (4) Date: Mar. 28, 2008

(87) PCT Pub. No.: WO2007/037088
PCT Pub. Date: Apr. 5, 2007

(65) Prior Publication Data
US 2009/0117860 A1    May 7, 2009

(30) Foreign Application Priority Data
Sep. 29, 2005  (JP) ................. 2005-283842

(51) Int. Cl.
H04B 1/40  (2006.01)
(52) U.S. Cl. ........... 455/87; 455/73; 455/77; 375/346
(58) Field of Classification Search .......... 455/517, 455/38.3, 422, 462, 465, 403, 509; 375/346; 370/347, 348
See application file for complete search history.

(56) References Cited

U.S. PATENT DOCUMENTS

| | | | | |
|---|---|---|---|---|
| 5,754,961 A | * | 5/1998 | Serizawa et al. | 455/517 |
| 6,049,721 A | * | 4/2000 | Serizawa et al. | 455/509 |
| 6,115,612 A | * | 9/2000 | Fukuda | 455/517 |
| 2005/0003855 A1 | | 1/2005 | Wada et al. | |
| 2006/0172769 A1 | | 8/2006 | Oh | |
| 2007/0009067 A1 | * | 1/2007 | Michalak | 375/346 |

FOREIGN PATENT DOCUMENTS

| | | |
|---|---|---|
| EP | 0 921 642 B1 | 12/2004 |
| JP | 10-013958 | 1/1998 |
| JP | 11-168303 | 6/1999 |
| JP | 2000-101578 A | 4/2000 |
| JP | 2002-094440 A | 3/2002 |
| JP | 2002-101004 A | 4/2002 |
| JP | 2003-046402 A | 2/2003 |
| JP | 2004-032062 A | 1/2004 |
| JP | 2004-320132 A | 11/2004 |
| JP | 2004-363926 A | 12/2004 |
| JP | 2005-236632 A | 9/2005 |

OTHER PUBLICATIONS

IEEE Computer Society, 804.15.4, Part 15.4: Wireless Medium Access control (MAC) and Physical Layer (PHY) Specifications for Low-Rate Wireless Personal Area Networks (LR-WPANs).

* cited by examiner

Primary Examiner — April G Gonzales
(74) Attorney, Agent, or Firm — Foley & Lardner LLP

(57) ABSTRACT

It is an object of the present invention to provide a wireless transmitting/receiving method for achieving both a high-speed data transfer and a power-saving operation by using wireless transmitting/receiving apparatus adaptable to a ubiquitous system, whereby a wireless transmitting/receiving method which performs wireless transmission/reception using no less than two carrier waves which belong to a different frequency band is used to transmit/receive a control signal for controlling the transmission/reception operation of the wireless transmitting/receiving apparatus by using a carrier wave which belongs to a lower frequency band (400 MHz band), and to transfer data by using a carrier wave which belongs to a higher frequency band (2.4 GHz band).

6 Claims, 10 Drawing Sheets

WIRELESS TRANSMITTING/RECEIVING METHOD AND WIRELESS TRANSMITTING/RECEIVING APPARATUS

This application is the National Phase of PCT/JP2006/316860, filed Aug. 28, 2006, which claims priority to Japanese Application No. 2005-283842, filed Sep. 29, 2005, the disclosures of which are hereby incorporated by reference in their entirety.

TECHNICAL FIELD

The present invention relates to a wireless transmitting/receiving apparatus for performing data exchange by performing wireless transmission/reception to and from a transmitting/receiving apparatus of a communication counterpart, and particularly to a wireless transmitting/receiving method for controlling the wireless transmission/reception performed between the wireless transmitting/receiving apparatuses.

BACKGROUND ART

As semiconductor microprocessing technology advances, wireless communication devices and apparatuses are stably supplied at a low cost and in a large quantity, becoming widespread in daily life. From now on, it is expected that a ubiquitous era will arrive when wireless communication devices are mounted on every entity. Since wireless communication devices in such ubiquitous era need to operate for long hours on a battery, reduction of the power consumption thereof has become an essential technology.

As one example of such wireless communication devices, a wireless device specification as shown in Non-patent Document 1 has been proposed. In FIG. 1 of Non-Patent Document 1, a configuration is shown in which a network is formed between wireless communication devices and in which data acquired by each device is sent to a server (a PAN coordinator). Also, in Patent Document 1, there is demonstrated a system in which a wireless communication device respectively mounted on a room temperature sensor, an air conditioner, and a hot-water supply apparatus transmits its state/operation to an external communication line, and the respective operational state is transferred by external means of communication to an external communication line. Further, in Patent Document 2, it is shown that a different frequency is used during transmission and during reception in a wireless communication device.

However, in the wireless communication systems disclosed in the above described Patent Document 1, Patent Document 2, and Non-patent Document 1, a problem exists in that a high-speed data communication and a power-saving operation are not consistent with each other. This is because the maximum transmitting/receiving rate of a wireless communication device is determined by the frequency band of the carrier wave to be used, while the power consumption thereof significantly depends on the frequency of the carrier wave.

That is, when performing a high-speed data communication such as image transfer, it is necessary to use a high frequency band such as a 5 GHz band or 2.4 GHz band; however, in order to extract data communicated in such a band from the carrier wave or to superimpose communication data on the carrier wave, a circuit which operates at a high-speed such as of 5 GHz or 2.4 GHz in the wireless communication device is necessary and such high-speed operation circuit part will consume the bulk of the power required for the wireless communication device.

Generally, in a wireless communication system, as shown in FIG. 1, a carrier wave of a single frequency band which is allocated by legal regulation such as a radio law is used to perform the transmission/reception of data and operational control. Therefore, the maximum transmission/reception data rate is determined by the allocated frequency band.

In the related art described in Patent Document 2, although separate carrier frequencies are used during transmission and during reception of a wireless communication device, the difference between the carrier frequencies is very small since it is based on the use of separate channels in the same frequency band, and therefore the difference in carrier frequency caused by selecting of different channels has little effect on the operational power.

Further, in Non-patent Document 1, a mechanism such as an intermittent operation is proposed to realize a low-power operation; however, in this system which utilizes a single frequency band, the total data communication amount will be reduced in proportion to the power decrease that results from the intermittent operation.

In recent years, an ad hoc network system which is realized only by terminals communicating with each other has gained much attention. This ad hoc network system is a system which is made up of, as shown in FIG. 2, a plurality of terminals 91 and communicates information with other terminals by exchanging transfer-data with each other on wireless transmission/reception signal 92 between terminals 91, the system being characterized in that it is not restricted by an access area and needs no expensive facilities.

A wireless communication network system which utilizes an ad hoc mesh network is widely used in a security ensuring system that utilize a monitor camera network, an entrance/exit inspection system, a physical distribution management system, a patient management system in medical fields, and the like.

Next, description will be made on a problem in the case in which a wireless transmitting/receiving apparatus that utilizes only one frequency band as shown in FIG. 1 is used as the terminal of the above described ad hoc network system.

First, a hidden terminal problem in an ad hoc wireless system will be described with reference to FIG. 3. In FIG. 3, terminal B and terminal C are in communication, and when terminal A is not aware that terminal B is in communication with terminal C, terminal A may send a communication request to terminal B which is performing communication. However, since terminal A cannot receive any response from terminal B, the communication request operation of terminal A becomes a wasted operation thereby consuming power ineffectually. A flow chart to describe this operation is shown in FIG. 4.

In FIG. 4, when terminal A issues a communication request to terminal B (step 111), since terminal B and terminal C are in communication, terminal A cannot receive a response from terminal B (step 112). Therefore, terminal A is on standby for a fixed time period (step 113) and thereafter again issues a communication request to terminal B (step 114), thus repeating steps 115 and 116. These steps will be repeated until the communication between terminal B and terminal C is completed. Then, when communication between terminal B and terminal C is completed (steps 117 and 118), if terminal A will issues a communication request to terminal B (step 119), terminal A receives a response from terminal B (step 120), and communication will be started.

FIG. 5 shows an exposed terminal problem in an ad hoc wireless system. FIG. 5 shows a situation in which although terminal C and terminal D are in communication, and terminal B is trying to perform a data transmission to terminal A, since terminal B can perceive the communication of terminal C, it cannot go into transmission operation and cannot perform data transmission to terminal A. A flow chart to show this operation will be shown in FIG. 6.

When terminal B wants a communication with terminal A (step 131), terminal B inevitably detects the communication carrier of terminal C (step 132). Then, terminal B is on standby for a fixed period of time (step 133), and thereafter detects the communication carrier of terminal C (step 134) when again determining the presence or absence of the communication carrier, thus coming into standby operation (step 135). Then, this step is repeated until communication between terminal C and terminal D is completed. Then, when communication between terminal C and terminal D is completed (steps 136 and 137), terminal B confirms the absence of communication carrier (step 138), and is then allowed to issue a communication request to terminal A (step 139).

Thus, when an ad hoc network system is configured by using a conventional wireless transmitting/receiving apparatus, useless communication processing will be repeated and thereby transmission power will be wasted.

Further, a typical wireless communication system has a problem in which the time period of reception standby will be longest for each terminal, and when a high-frequency carrier frequency band is used in order to realize a high speed operation by increasing the transmitting/receiving transfer rate, it is necessary to operate a circuit for receiving a high carrier frequency even for standby operation and thereby power consumption will be increased.

Patent Document 1: Japanese Patent Laid-Open No. 2001-101578
Patent Document 2: Japanese Patent Laid-Open No. 10-13958
Non-patent Document 1: IEEE Computer Society, 804.15.4, Part 15.4: Wireless Medium Access Control (MAC) and Physical Layer (PHY) Specifications for Low-Rate Wireless Personal Area Networks (LR-WPANs)

In the conventional transmitting/receiving apparatus described above, a problem exists in which high-speed data communication and a power-saving operation cannot be achieved at the same time.

It is an object of the present invention to provide a wireless transmitting/receiving apparatus and a wireless transmitting/receiving method which enables realizing both high-speed data communication and a power-saving operation.

DISCLOSURE OF THE INVENTION

In order to achieve the above described object, the wireless transmitting/receiving method of the present invention is a wireless transmitting/receiving method for performing wireless transmission/reception using no less than two carrier waves which belong to a different frequency band, comprising the steps of:

transmitting/receiving a control signal for controlling the transmission/reception operation of a wireless transmitting/receiving apparatus, by using a carrier wave which belongs to a lower frequency band; and transferring data by using a carrier wave which belongs to a higher frequency band.

Moreover, the above described control signal may include a signal for performing authentication processing of a communication counterpart.

Further, the transmitting/receiving method of the present invention may further comprise the steps of:

performing power adjustment to reduce the transmission power of a communication using a lower frequency band and, when the communication of the lower frequency band is disabled, performing transmission power adjustment of the communication that uses the lower frequency band by increasing the transmission power of the communication using the lower frequency band by means of a communication that uses higher frequency band; and performing power adjustment for reducing the transmission power of a communication using a higher frequency band and, when the communication of the higher frequency band is disabled, performing transmission power adjustment of the communication that uses the higher frequency band by increasing the transmission power of the communication using the higher frequency band by means of a communication that uses the lower frequency band.

According to the present invention, it becomes possible to achieve both a high-speed data communication and a power-saving operation by transmitting/receiving a control signal such as a signal for performing authentication processing using a carrier wave which belongs to a lower frequency band which consumes less power, and after a communication counterpart is determined, transferring data using a carrier wave which belongs to a higher frequency band by which a maximum transmission/reception rate may be set at a high value.

By this arrangement, it is possible to reduce power consumption by performing communication using a lower frequency band during signal reception standby period which occupies the bulk of the operation in a ubiquitous wireless system, and to enable high-speed data communication by performing communication using a higher frequency band when performing active communication.

As so far described, according to the present invention, it is possible to achieve an effect in which high-speed data communication and a low-power consumption operation can be achieved at the same time by transmitting/receiving control signals by using a carrier wave which belongs to a lower frequency band which consumes less power, and by transferring data by using a carrier wave which belongs to a higher frequency band in which a higher maximum transmission/reception rate can be set.

DESCRIPTION OF SYMBOLS

Figure 1:
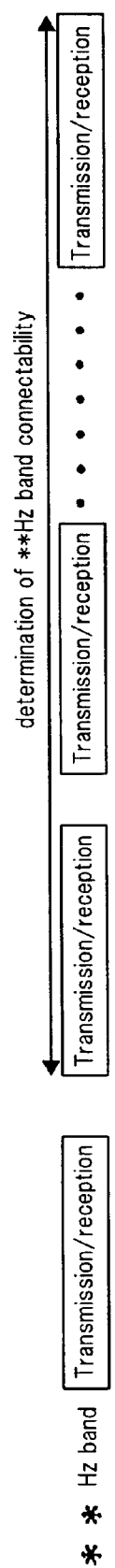
FIG. 1 shows a network connection protocol example according to a conventional wireless transmitting/receiving method.

1 Filter
2 2.4 GHz band transmitting/receiving part
3 Authentication and power control part
4 Filter
5 400 MHz band transmitting/receiving part
6 Reception control signal
7 Transmission control signal
8 2.4 GHz band transceiver part operation control signal
41-46 Step
51-63 Step
71-76 Step
81-86 Step
91 Terminal
92 Wireless transmission/reception signal
111-120 Step
131-139 Step

BEST MODE FOR CARRYING OUT THE INVENTION

Next, exemplary embodiments of the present invention will be described in detail with reference to the drawings. Here, by way of simplicity, description will be made on the simplest case in which there are two frequency bands. The term "frequency band" used herein refers to a frequency range which is individually defined based on legal regulation relating to radio usage, typified by radio law, and based on a standard specification.

Figure 7:
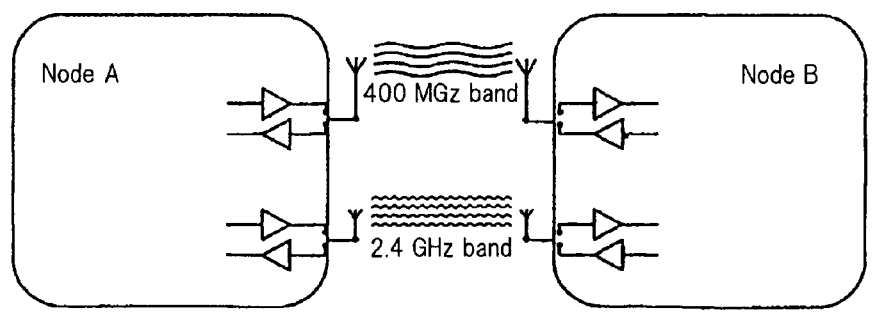
FIG. 7 is a conceptual diagram to show a communication form between wireless apparatuses which use the wireless transmitting/receiving method according to an exemplary embodiment of the present invention.

FIG. 7 shows the manner in which communication is performed between wireless communication devices according to the present embodiment. Between node A and node B which make up a network, communication is being performed using both a lower frequency band (a 400 MHz band in this case) and a higher frequency band (a 2.4 GHz band in this case).

Figure 8:
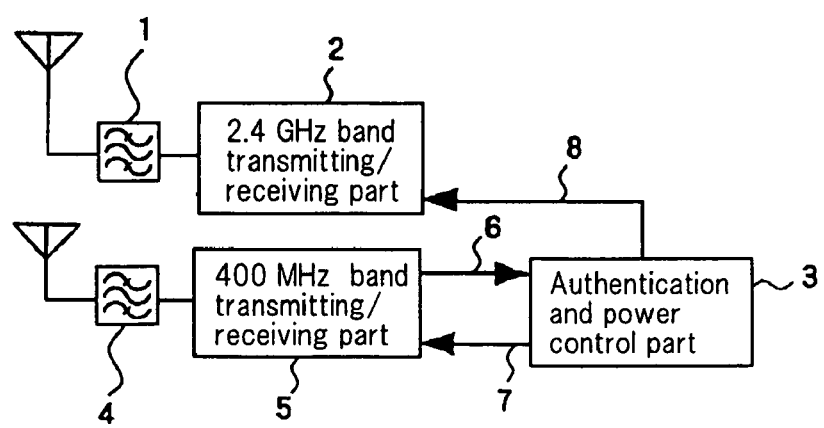
FIG. 8 shows an example of the wireless transmitting/receiving apparatus to implement the wireless transmitting/receiving method according to an exemplary embodiment of the present invention.

Next, a specific configuration example of the wireless transmitting/receiving apparatus as shown in FIG. 7 will be shown in FIG. 8. This wireless transmitting/receiving apparatus comprises filters 1 and 4, 2.4 GHz band transmitting/receiving part 2, 400 MHz band transmitting/receiving part 5, and authentication and power control part 3.

2.4 GHz band transmitting/receiving part 2 for transmitting/receiving a signal provided by a carrier wave belonging to a 2.4 GHz band which is a higher frequency band.

400 MHz band transmitting/receiving part 5 for transmitting/receiving a signal provided by a carrier wave belonging to a 400 MHz band which is a lower frequency band.

Authentication and power control part 3 exchanges a control signal for controlling a transmission/reception operation such as an authentication processing with a communication counterpart using 400 MHz band transmitting/receiving part 5, and when a communication counterpart is determined, operates 2.4 GHz band transmitting/receiving part 2 to perform data transmission/reception to and from the communication counterpart.

In the transmitting/receiving apparatus in the present embodiment, as shown in FIG. 8, transmitting/receiving parts 2, 5 which correspond to a plurality of carrier frequencies, are provided in the same apparatus. The higher frequency circuit (2.4 GHz band transmitting/receiving part 2 in this case), which consumes more power, is adapted to operate only when the reception of the lower frequency circuit (400 MHz band) is qualified. In the example of FIG. 8, signal 6 received by 400 MHz band transmitting/receiving part 5 is analyzed at authentication control part 3, and when determined that it is a signal transmitted from a normal counterpart, authentication control part 3 outputs response signal 7 for the communication counterpart to 400 MHz band transmitting/receiving part 5. Then, authentication control part 3 outputs 2.4 GHz band transceiver part operation control signal 8 for activating the power/clock signal generation of 2.4 GHz band transmitting/receiving part 2 to enable the transmission/reception in the 2.4 GHz band. Therefore, 2.4 GHz band transmitting/receiving part 2, which is a high-frequency band circuit, operates only intermittently, and thus the need of continuous operation of 2.4 GHz band transmitting/receiving part 2, which is necessary when directly receiving a 2.4 GHz band signal, is obviated thereby enabling to suppress power consumption. Further, in the wireless transmitting/receiving apparatus of the present embodiment, when high-speed communication is actively performed, an authentication signal is transmitted from 400 MHz band transmitting/receiving part 5 to a counterpart node, and after the completion of authentication, 2.4 GHz band transmitting/receiving part 2 is operated so that a high-speed data communication is realized.

In the embodiment described above, the setting of 400 MHz band transmission/reception power and 2.4 GHz band transmission/reception power may be adaptively optimized.

For example, authentication control part 3 performs power adjustment to reduce the transmission power of the communication which uses a 400 MHz band and, when the communication in the 400 MHz band is disabled, performs transmission power adjustment of the communication using 400 MHz band by increasing the transmission power of the communication which uses the 400 MHz band, by means of the communication that uses the 2.4 GHz band.

Further, authentication control part 3 performs power adjustment to reduce the transmission power of the communication which uses the 2.4 GHz band and, when the communication of 2.4 GHz band is disabled, performs transmission power adjustment of the communication which uses the 2.4 GHz band by increasing the transmission power of the communication which uses the 2.4 GHz band, by means of the communication that uses the 400 MHz band.

Figure 9:
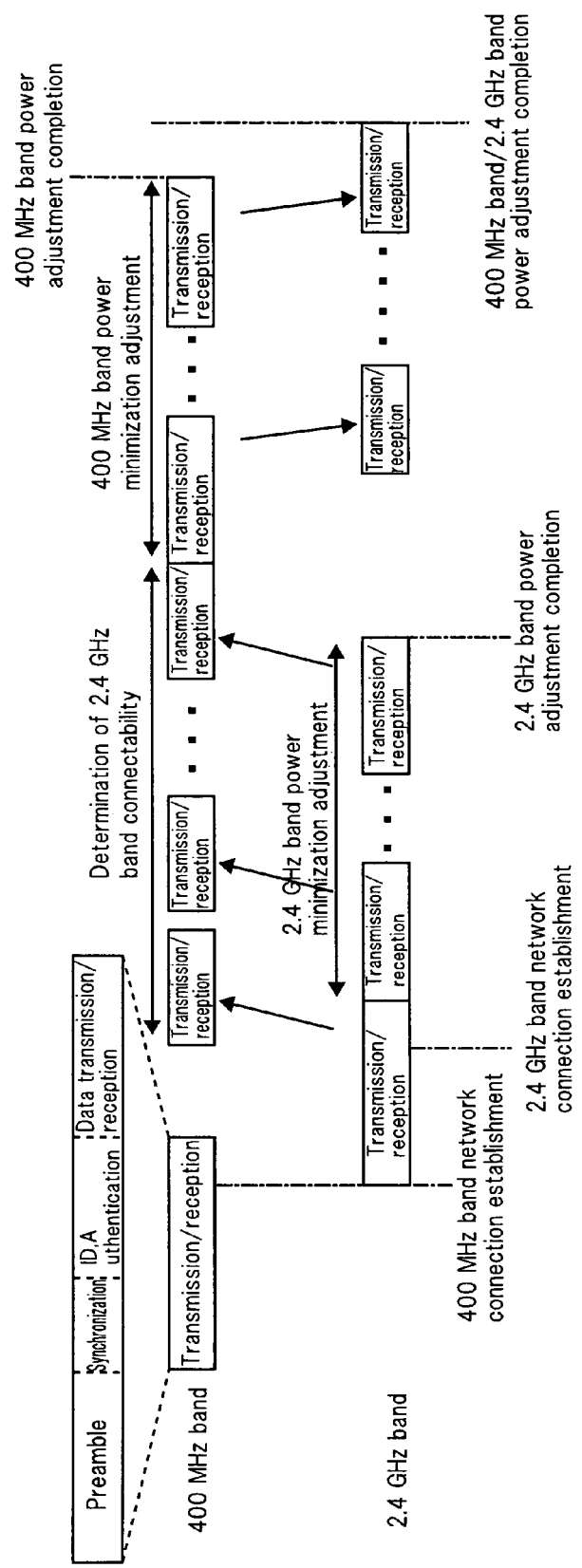
FIG. 9 shows an example of the network protocol which uses the wireless transmitting/receiving method according to an exemplary embodiment of the present invention.

The procedure for thus adaptively optimizing the setting of 400 MHz band transmission/reception power and the 2.4 GHz band transmission/reception power is shown in FIG. 9. Network connection between nodes shown in FIG. 7 is first started from the 400 MHz band. In the first transmission/reception of the 400 MHz band, data transmission/reception is performed after performing initialization processing such as preamble, carrier sense, synchronization, and authentication processing. Here, by arranging a configuration such that communication in the 2.4 GHz band is performed only with a communication counterpart which can perform normal authentication processing in 400 MHz band, ensuring security in 2.4 GHz band communication is made possible. Further, since performing authentication in the 400 MHz band obviates the need for using the 2.4 GHz band for the communication from a communication counterpart other than approved communication counterpart, it is possible to reduce the frequency of the high-frequency communication operation which consumes much power. Further, by using a transmission/reception device comprising a mutually independent transmitting/receiving apparatus respectively for the 400 MHz band and the 2.4 GHz band, it is possible to implement transmission/reception of 400 MHz band and 2.4 GHz band in parallel.

Figure 10:
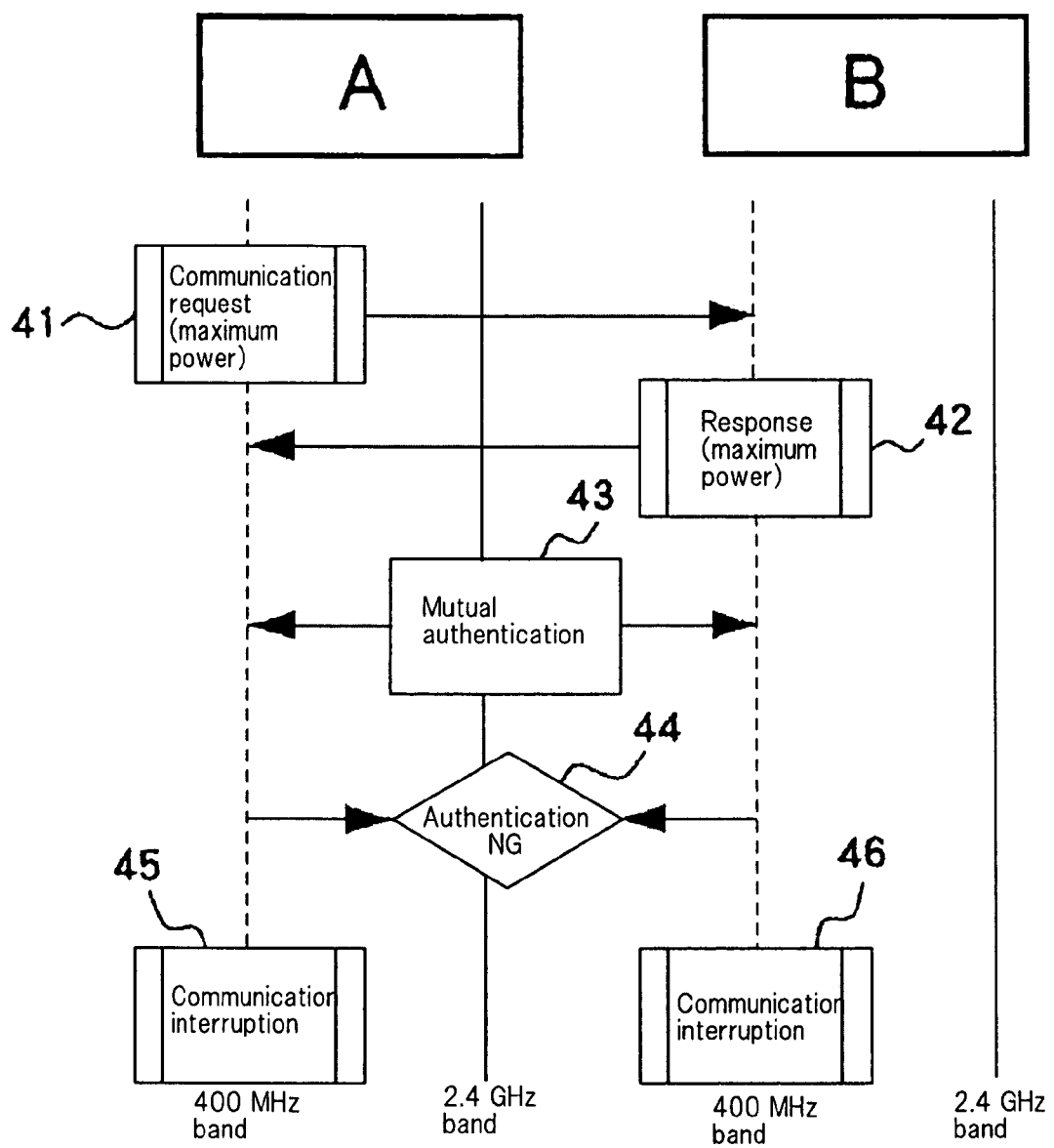
FIG. 10 is a flowchart to show processing in the case in which authentication in a 400 MHz band is not performed in the wireless transmitting/receiving method according to an exemplary embodiment of the present invention.
Figure 11:
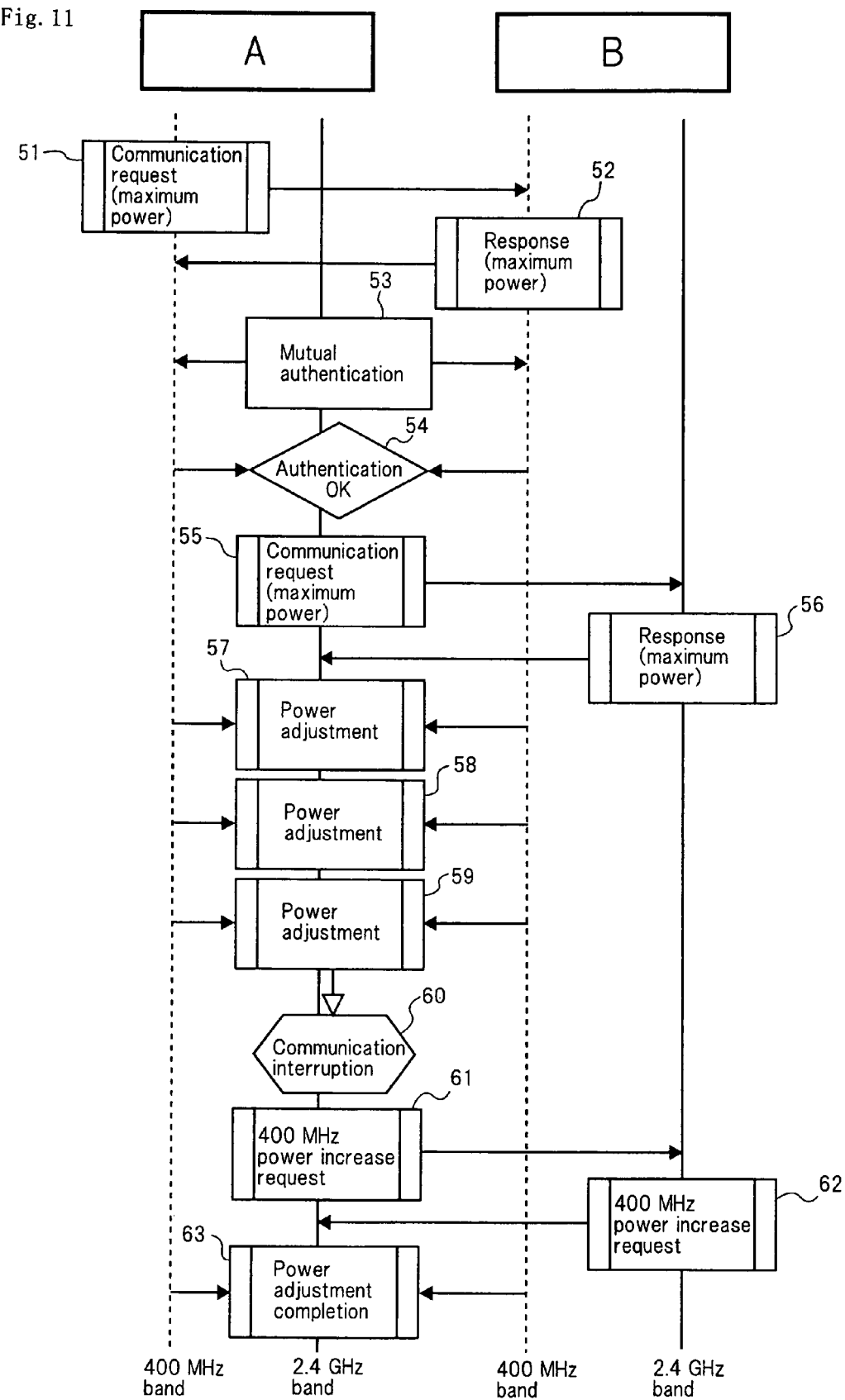
FIG. 11 is a flowchart to show processing in the case in which authentication in a 400 MHz band is performed and power adjustment of the 400 MHz band is performed with 2.4 GHz band communication being established in the wireless transmitting/receiving method according to an exemplary embodiment of the present invention.

As shown in FIG. 9, power adjustment of the 400 MHz band transmitting/receiving apparatus can be performed in parallel while performing transmission/reception in the 2.4 GHz band. FIG. 10 shows the processing in the case in which authentication in the 400 MHz band has not been performed, and FIG. 11 shows processing in the case in which authentication in the 400 MHz band has been performed, and power adjustment of the 400 MHz band is performed with a 2.4 GHz band communication being established.

First, description will be made of the operation when authentication is not performed, with reference to FIG. 10. In this case, terminal A issues a communication request to terminal B at a maximum power using a frequency of the 400 MHz band (step 41). Having received this communication request from terminal A, terminal B makes a response to terminal A at a maximum power using a frequency of the 400 MHz band (step 42). Thereafter, mutual authentication is performed between terminal A and terminal B using a frequency of the 400 MHz band (step 43). However, in this case, since authentication result will be "NG" (step 44), terminals A and B interrupt communication and end the communication (steps 45 and 46).

Next, referring to FIG. 11, description will be made of the operation when authentication in the 400 MHz band is performed and power adjustment of 400 MHz band is performed with 2.4 GHz band communication being established. In this case, terminal A issues a communication request to terminal B at a maximum power using a frequency in the 400 MHz band (step 51). Having received the communication request from terminal A, terminal B makes a response to terminal A at a maximum power using a frequency in the 400 MHz band (step 52). Thereafter, mutual authentication is performed between terminal A and terminal B using a frequency in the 400 MHz band (step 53). The processing so far described is the same as that in the flowchart shown in FIG. 10.

However, here, since the authentication result will be "OK" (step 54), terminal A issues a communication request to terminal B at a maximum power using a frequency of the 2.4 GHz band (step 55). Then, having received the communication request from terminal A, terminal B makes a response to terminal A at a maximum power using a frequency of the 2.4 GHz band (step 56).

Thus, with communication in the 2.4 GHz band being established, terminals A and B perform power adjustment of a frequency of the 400 MHz band (steps 57 to 59). When communication between terminals A and B having a frequency of the 400 MHz band is interrupted by this power adjustment (step 60), terminal A issues a request for an increase in the power of the frequency of the 400 MHz band to terminal B through a frequency of the 2.4 GHz band (step 61). Similarly, terminal B issues a request for an increase in the power of a frequency of the 400 MHz band to terminal A through a frequency of the 2.4 GHz band (step 62). Thus, the power of a frequency of the 400 MHz band between terminals A and B is adjusted to be a minimum power for enabling communication (step 63).

In FIG. 11, it is shown that the initial connection is performed at a maximum power for both the 400 MHz band and the 2.4 GHz band, and adjustment is performed to gradually decrease the power of the 400 MHz band. Since, as power decreases, the communicable distance decreases and the S/N ratio declines, communication in the 400 MHz band is interrupted at a certain point. At this time, by increasing processing power by using the 2.4 GHz band that is being used for communication, a 400 MHz band communication is established having the required, sufficient power. In the wireless transmitting/receiving method according to the present embodiment, even when the power of the transmitting/receiving equipment is excessively decreased resulting in an interruption of the 400 MHz band communication, since communication using the 2.4 GHz band can be continued to confirm the state of each node with each other, the need of synchronization and authentication processing, etc. between wireless communication devices is obviated. Consequently, when establishing communication in the 400 MHz band again, it is possible to drastically simplify and shorten the above described initialization processing. Therefore, compared with the conventional example shown in FIG. 1, the power adjustment of the 400 MHz band can be completed very rapidly.

Similarly, performing power adjustment of the 2.4 GHz band after the completion of the power adjustment of the 400 MHz band enables communication at a minimum power in each frequency band.

Further, as shown in FIG. 10, since when authentication processing cannot be performed in the 400 MHz band, the wireless transmitting/receiving apparatus of the 2.4 GHz band, which consumes more power, will not be operated, it is possible to avoid wasteful power consumption.

Furthermore, it is possible to realize a wireless transmitting/receiving method by which a low-power operation is made possible in the time period of the standby operation for signal reception, which occupies the bulk of the operation time period of a ubiquitous system, and high-speed data transfer can be performed during a spontaneous active operation.

Figure 2:
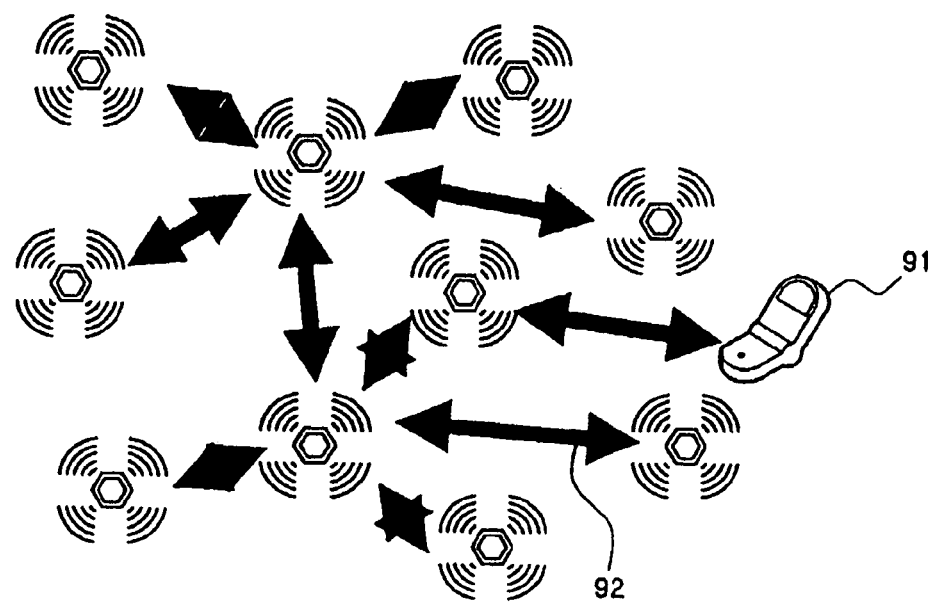
FIG. 2 is a conceptual diagram to show an ad hoc network connection.

Next, description will be made of the operation when such wireless transmitting/receiving apparatus is applied to the ad hoc network system shown in FIG. 2.

Figure 3:
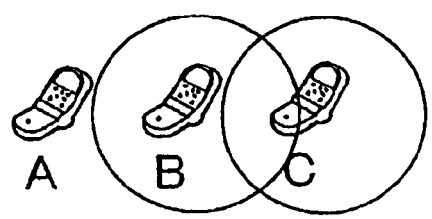
FIG. 3 is a conceptual diagram to describe a hidden terminal problem in an ad hoc network.
Figure 4:
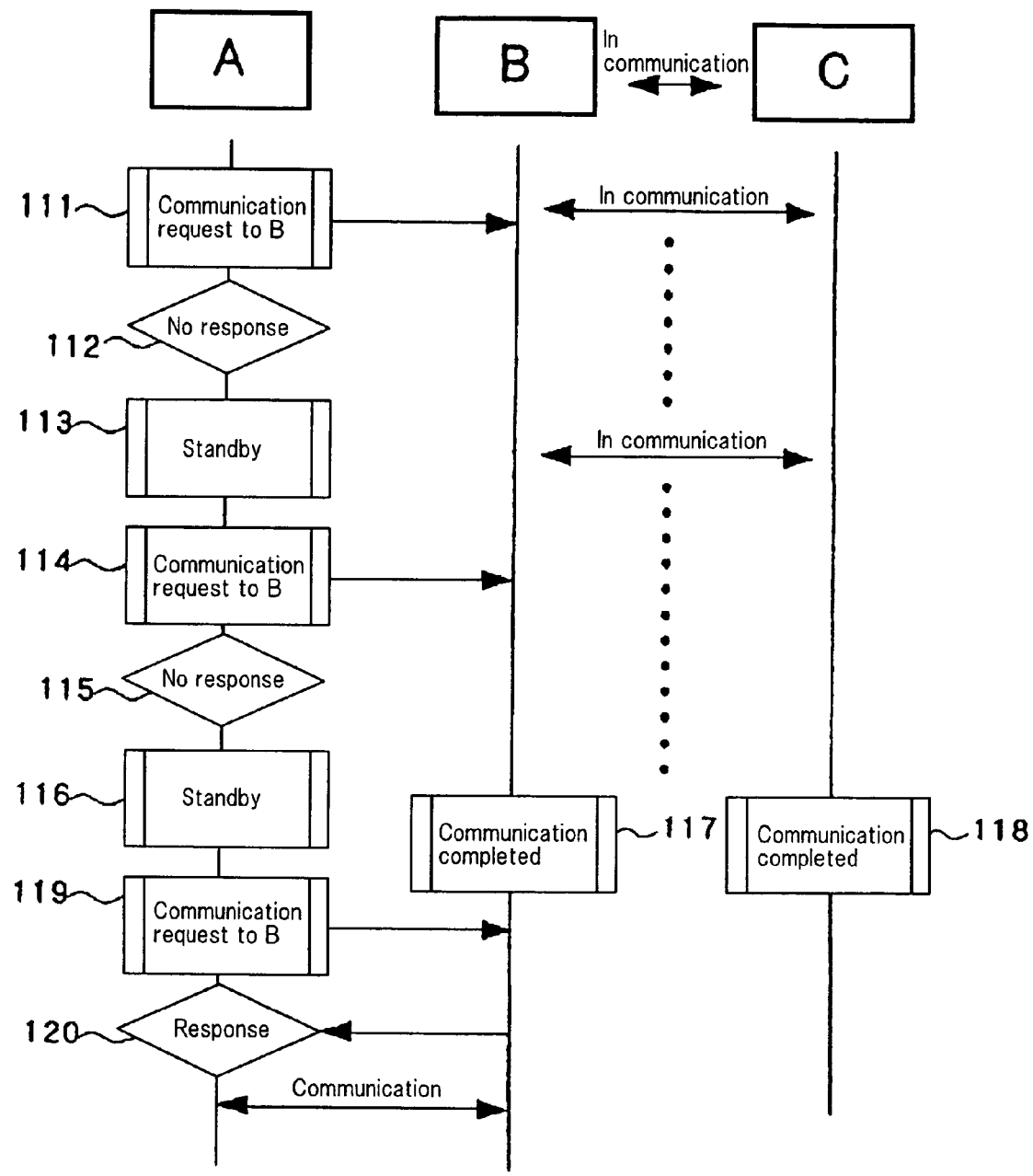
FIG. 4 is a flow chart to describe a conventional operation under a hidden terminal environment in an ad hoc network.
Figure 5:
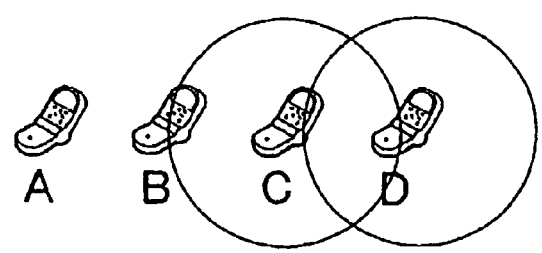
FIG. 5 is a conceptual diagram to describe an exposed terminal problem in an ad hoc network.
Figure 6:
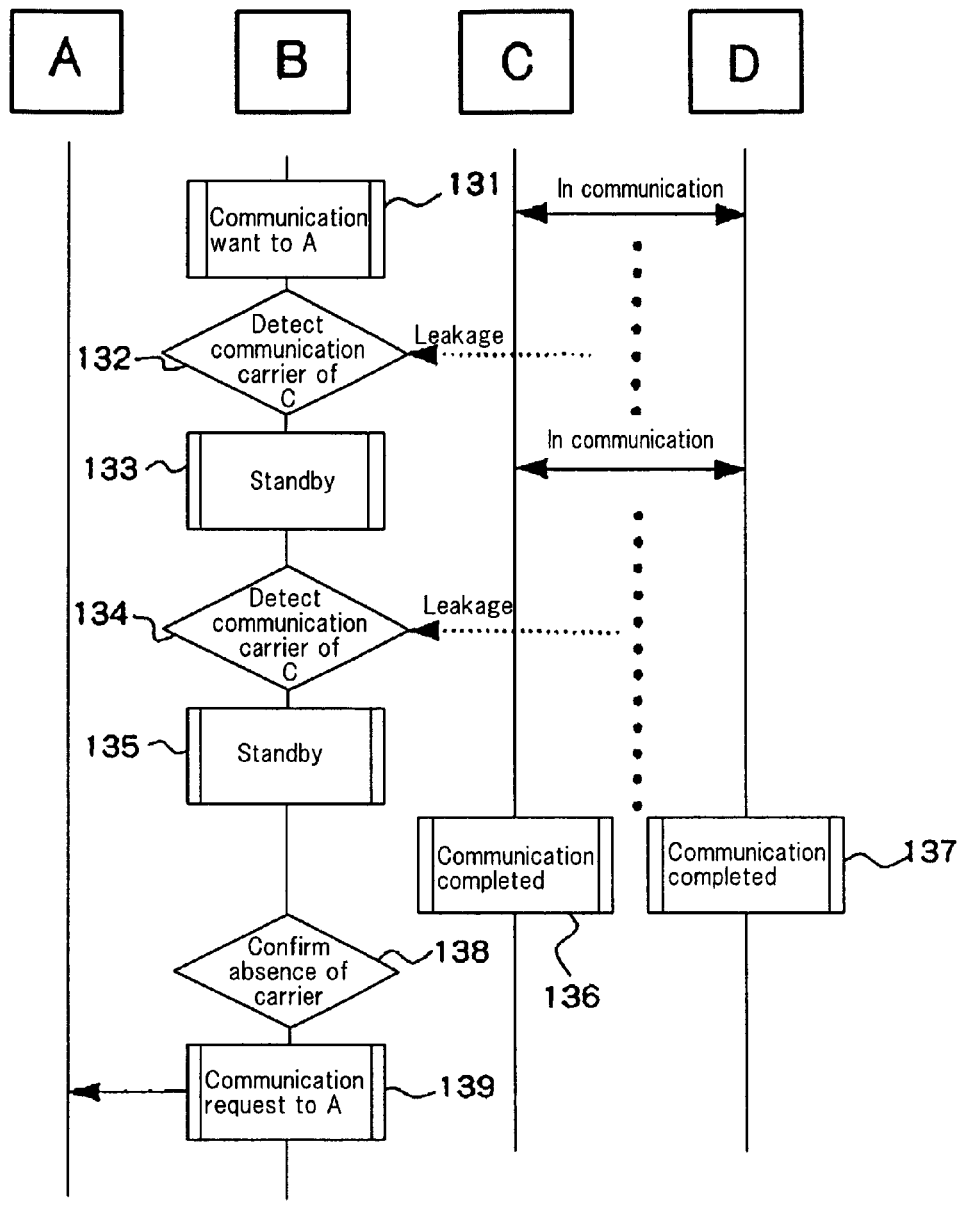
FIG. 6 is a flow chart to describe a conventional operation in an exposed terminal environment of an ad hoc network.

In an ad hoc network system made up of a conventional wireless transmitting/receiving apparatus which utilizes only one frequency band, as described above, the hidden terminal problem and the exposed terminal problem shown in FIGS. 3 and 5 take place. However, by using a wireless transmitting/receiving apparatus which utilizes two frequency bands such as the wireless transmitting/receiving apparatus of the present embodiment, solving these problems is made possible thereby reducing power consumption.

Figure 12:
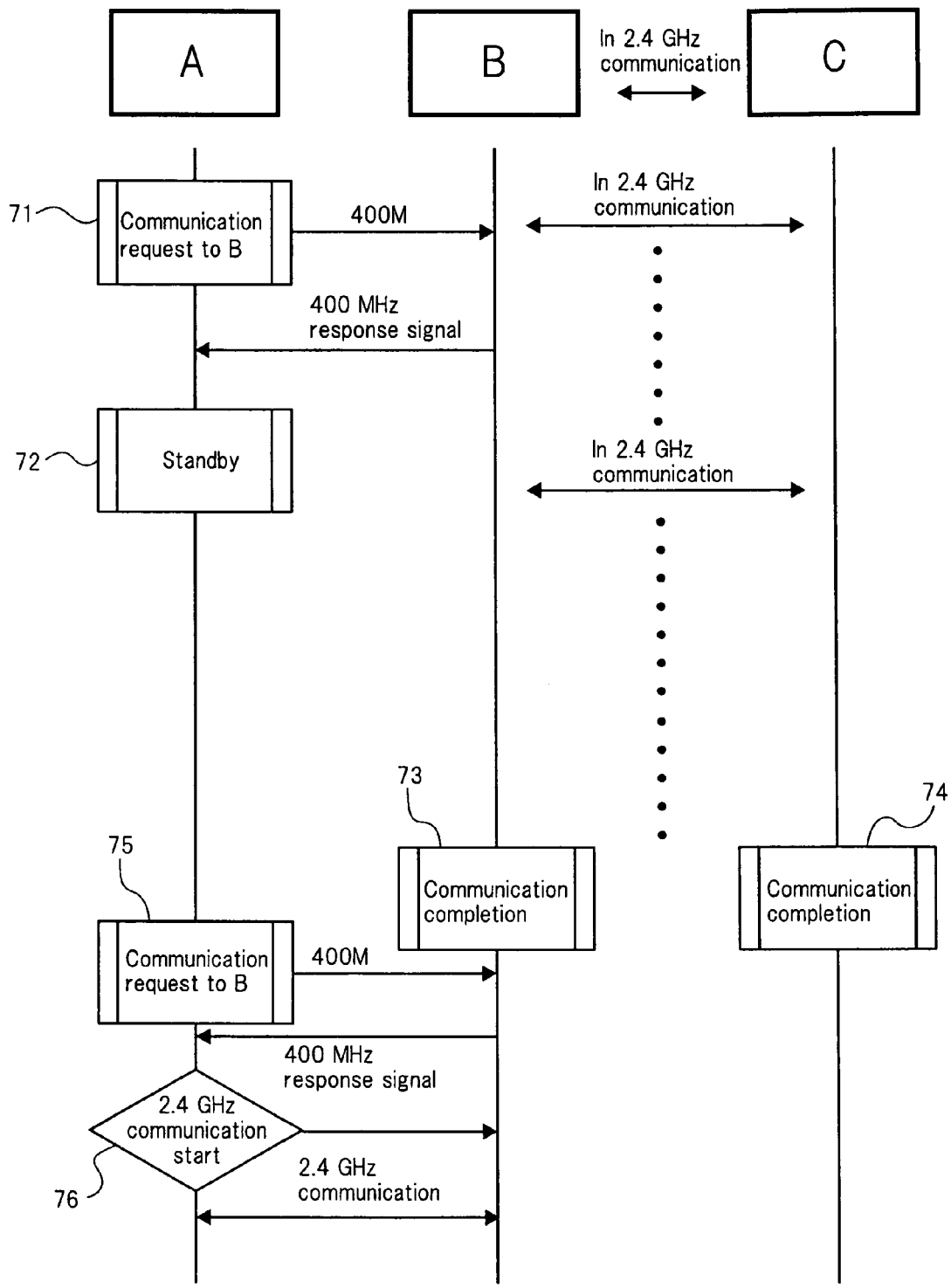
FIG. 12 is a flowchart to describe the operation according to the present invention under a hidden terminal environment in an ad hoc network.

In the wireless transmitting/receiving apparatus of the present embodiment, since even under a hidden terminal environment in which terminal B and terminal C are in communication using a frequency of the 2.4 GHz band as shown in FIG. 3, terminal B can receive a communication request which utilizes a frequency of the 400 MHz band from terminal A, and terminal B can return a response signal to terminal A. The operations of terminals A, B, and C at this time are shown in FIG. 12.

First, terminal A issues a communication request to terminal B using a frequency of the 400 MHz band (step 71). At this time, even if terminal B and terminal C are in communication using a frequency of the 2.4 GHz band, terminal B can transmit a response signal to terminal A. Therefore, terminal A can learn that terminal B is in communication with terminal C, thereby terminal A comes into a standby state (step 72). And when the communication between terminal B and terminal C is completed (steps 73 and 74), terminal A issues a communication request to terminal B and receives a response signal from terminal B to start communication with terminal B using a frequency of the 2.4 GHz band (step 76).

Since thus terminal B can notify terminal A of the fact that it is in communication, and of the communication time period of the ongoing communication etc., terminal A is prevented from making a useless communication request. As a result of this, the problem of power increase due to useless operation of terminal A will be solved.

Figure 13:
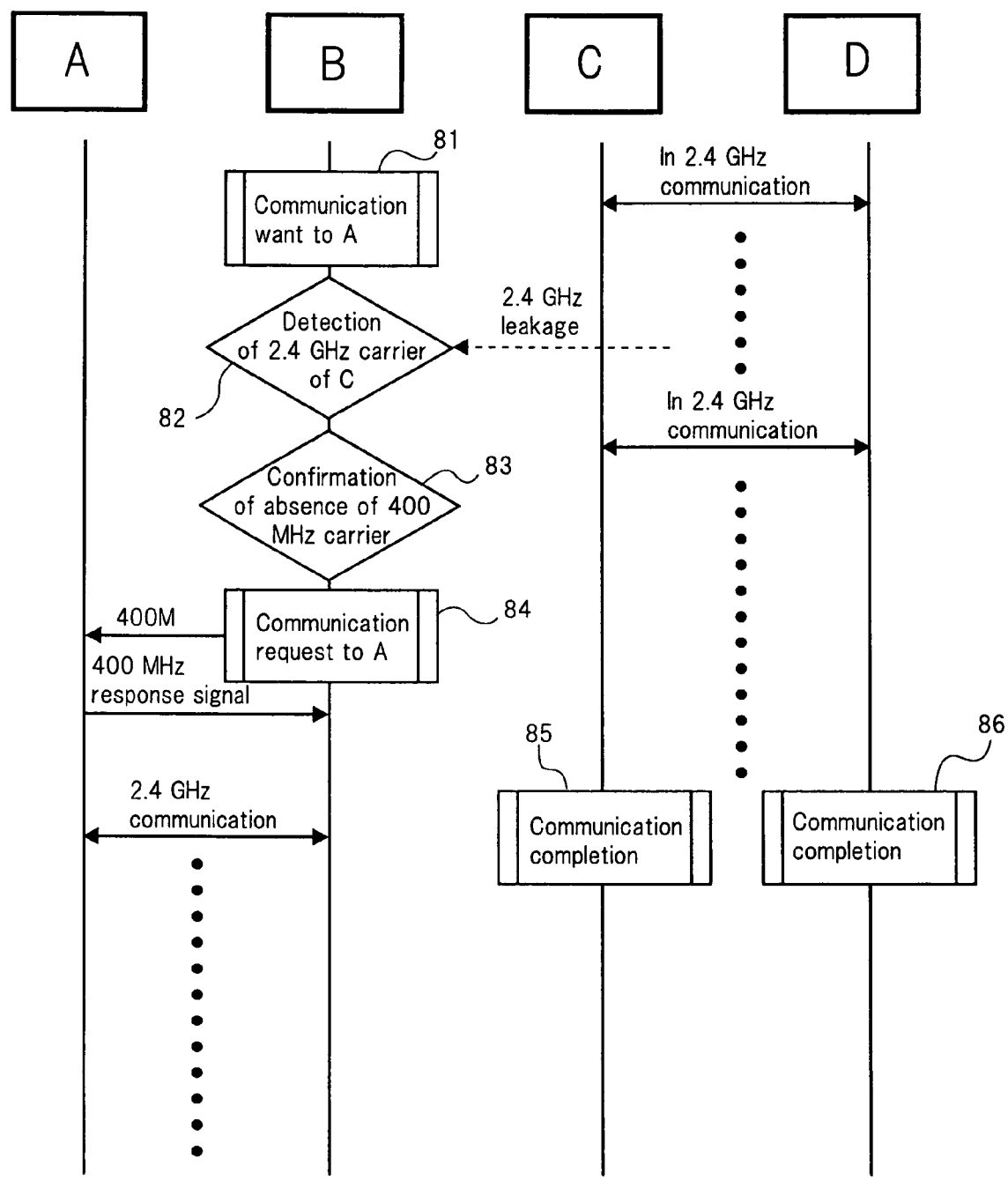
FIG. 13 is a flowchart to describe the operation according to the present invention under an exposed terminal environment in an ad hoc network.

Further, in the wireless transmitting/receiving apparatus of the present embodiment, even in the case of an exposed terminal problem as shown in FIG. 5 in which terminal C and terminal D are communicating in 2.4 GHz, terminal B can issue a communication request using the 400 MHz band to terminal A to establish communication between terminal B and terminal A. The operations of terminals A, B, C and D at this time are shown in FIG. 13.

First, when terminal B wants to established communication with terminal A (step 81), although terminal B detects the signal of the 2.4 GHz communication carrier of terminal C (step 82) by confirming the signals of communication carriers that can be received, it confirms that there is no signal from communication carrier having a 400 MHz (step 83). Therefore, terminal B issues a communication request to terminal A using a frequency of the 400 MHz band (step 84). Then, terminal B receives a response signal using a frequency of the 400 MHz band from terminal A to perform communication.

Then, when communication between terminal C and terminal D using a frequency of the 2.4 GHz band is completed (steps 85 and 86), terminal A and terminal B start communication using a frequency of the 2.4 GHz band.

INDUSTRIAL APPLICABILITY

Thus, according to the wireless transmitting/receiving method of the present embodiment, the hidden terminal problem and the exposed terminal problem, which cause a problem in an ad hoc network made up of conventional wireless transmitting/receiving apparatuses, have been solved. As a result, the frequency at which useless transmitting/receiving operations are performed decreases, and the power-saving characteristics and the communication data rate of the entire network are improved.

That is, according to the wireless transmitting/receiving method of the present embodiment, by using two carrier frequencies to optimally control the transmission/reception power at a high-speed for each carrier frequency, it is possible to cope with problems that are specific to a ubiquitous ad hoc network, such as a hidden terminal problem and an exposed terminal problem, and to realize the minimization of power consumption during operation.

Further, since power during transmission/reception is minimized by using carrier waves of two frequency bands, which complies a higher frequency band and a lower frequency band, a synergic effect is achieved by avoiding the problem caused by radio waves that reach parties with which communication is not to be performed as shown in FIGS. 3 and 5.

Although, by way of simplicity, description has been made on the case in which two frequency bands are used, a 400 MHz band and a 2.4 GHz band, the present invention will not be limited to such case, and may be similarly applied to the cases in which more than two frequency bands are used.

The invention claimed is:

1. A wireless transmitting/receiving method for performing wireless transmission/reception using no less than two carrier waves which belong to a different frequency band, comprising:

transmitting/receiving a control signal for controlling the transmission/reception operation of a wireless transmitting/receiving apparatus, by using a carrier wave which belongs to a lower frequency band;

transferring data by using a carrier wave which belongs to a higher frequency band;

performing power adjustment for reducing the transmission power of a communication using a lower frequency band and, when the communication that uses a lower frequency band is disabled, performing transmission power adjustment of the communication using the lower frequency band by increasing the transmission power of the communication using the lower frequency band by means of a communication that uses the higher frequency band; and performing power adjustment for reducing the transmission power of a communication using a higher frequency band and, when the communication that uses the higher frequency band is disabled, performing transmission power adjustment of the communication using the higher frequency band by increasing the transmission power of the communication using the higher frequency band by means of a communication that uses the lower frequency band.

2. The wireless transmitting/receiving method according to claim 1, wherein said control signal may include a signal for performing authentication processing of a communication counterpart.

3. A wireless transmitting/receiving apparatus, comprising:

a first transmitting/receiving part for transmitting/receiving a signal provided by a carrier wave belonging to a first frequency band;

a second transmitting/receiving part for transmitting/receiving a signal provided by a carrier wave belonging to a second frequency band which has a higher frequency than that of said first frequency band;

an authentication control part for exchanging a control signal with a communication counterpart for controlling the transmitting/receiving operation using a carrier wave belonging to the first frequency band by controlling said first transmitting/receiving part, and when a communication counterpart is determined, operating said second transmitting/receiving part to perform data transmission/reception to and from the communication counterpart;

wherein said authentication control part performs power adjustment for reducing the transmission power of a communication using said first frequency band and when said communication that uses the first frequency band is disabled, performs transmission power adjustment of the communication using said first frequency band by increasing the transmission power of the communication using said first frequency band by means of a communication that uses said second frequency band; and wherein said authentication control part performs power adjustment for reducing the transmission power of a communication using said second frequency band and when said communication that uses the second frequency band is disabled, performs transmission power adjustment of the communication using said second frequency band by increasing the transmission power of the communication using said second frequency band by means of a communication that uses said first frequency band.

4. The wireless transmitting/receiving apparatus according to claim 3,
wherein said control signal includes a signal for performing authentication processing of a communication counterpart.

5. A wireless transmitting/receiving method for performing wireless transmission/reception in a mesh network system using a radio wave for data transmission in terminals, and using no less than two carrier waves which belong to a different frequency band, comprising:
   transmitting/receiving, within the mesh network system, a control signal for controlling the transmission/reception operation of a wireless transmitting/receiving apparatus, by using a carrier wave which belongs to a lower frequency band, wherein said control signal may include a signal for performing authentication processing of a communication counterpart; and
   transferring data by using a carrier wave which belongs to a higher frequency band;
   performing power adjustment for reducing the transmission power of a communication using a lower frequency band and, when the communication that uses a lower frequency band is disabled, performing transmission power adjustment of the communication using the lower frequency band by increasing the transmission power of the communication using the lower frequency band by means of a communication that uses the higher frequency band; and
   performing power adjustment for reducing the transmission power of a communication using a higher frequency band and, when the communication that uses the higher frequency band is disabled, performing transmission power adjustment of the communication using the higher frequency band by increasing the transmission power of the communication using the higher frequency band by means of a communication that uses the lower frequency band.

6. A wireless transmitting/receiving apparatus in a mesh network system using a radio wave for data transmission in terminals, comprising:
   a first transmitting/receiving part for transmitting/receiving a signal provided by a carrier wave belonging to a first frequency band;
   a second transmitting/receiving part for transmitting/receiving a signal provided by a carrier wave belonging to a second frequency band which has a higher frequency than that of said first frequency band; and
   an authentication control part for exchanging, within the mesh network system, a control signal with a communication counterpart for controlling the transmitting/receiving operation using a carrier wave belonging to the first frequency band by controlling said first transmitting/receiving part, and when a communication counterpart is determined, operating said second transmitting/receiving part to perform data transmission/reception to and from the communication counterpart, wherein said control signal includes a signal for performing authentication processing of a communication counterpart,
   wherein said authentication control part performs power adjustment for reducing the transmission power of a communication using said first frequency band and when said communication that uses the first frequency band is disabled, performs transmission power adjustment of the communication using said first frequency band by increasing the transmission power of the communication using said first frequency band by means of a communication that uses said second frequency band; and
   wherein said authentication control part performs power adjustment for reducing the transmission power of a communication using said second frequency band and when said communication that uses the second frequency band is disabled, performs transmission power adjustment of the communication using said second frequency band by increasing the transmission power of the communication using said second frequency band by means of a communication that uses said first frequency band.

* * * * *